US010575342B2

(12) United States Patent
Hruby et al.

(10) Patent No.: US 10,575,342 B2
(45) Date of Patent: Feb. 25, 2020

(54) SYSTEMS AND METHODS OF CONTROLLING MEDIA CONTENT IN A MULTI-ROOM ENVIRONMENT USING A WIRELESS COMMUNICATION DEVICE

(71) Applicant: VTV Technologies, Inc., Burr Ridge, IL (US)

(72) Inventors: Bret Hruby, Burr Ridge, IL (US); Michael Zhao, Burr Ridge, IL (US)

(73) Assignee: VTV Technologies, Inc., Burr Ridge, IL (US)

( * ) Notice: Subject to any disclaimer, the term of this patent is extended or adjusted under 35 U.S.C. 154(b) by 206 days.

(21) Appl. No.: 15/371,160

(22) Filed: Dec. 6, 2016

(65) Prior Publication Data

US 2018/0160455 A1 Jun. 7, 2018

(51) Int. Cl.
*H04W 76/10* (2018.01)
*H04W 12/06* (2009.01)
(Continued)

(52) U.S. Cl.
CPC ......... *H04W 76/10* (2018.02); *H04L 65/4069* (2013.01); *H04L 65/4084* (2013.01);
(Continued)

(58) Field of Classification Search
CPC ....... H04W 76/10; H04W 4/80; H04W 48/20; H04W 12/06; H04N 21/4367;
(Continued)

(56) References Cited

U.S. PATENT DOCUMENTS 9,439,240 B1 * 9/2016 Shipley ................... H04W 8/20
2005/0188406 A1 * 8/2005 Gielow ............. H04L 29/06027
725/81

(Continued)

FOREIGN PATENT DOCUMENTS

EP 2753128 7/2014

OTHER PUBLICATIONS

Partial Search Report for Internation Application No. PCT/IB/2017/057672 dated Apr. 9, 2018; 4 pages.
(Continued)

*Primary Examiner* — Davoud A Zand
(74) *Attorney, Agent, or Firm* — Sheppard Mullin Richter & Hampton LLP

(57) ABSTRACT

This disclosure relates to systems and methods for controlling media content with a wireless device in a wireless communication network via a media content streaming device communicatively coupled to an access point in a multi-room environment. Users associated with client computing platforms may obtain authentication to the wireless communication network via the access point. Upon gaining access to wireless communication network, users may be able to access the Internet using their client computing platforms. Users may be able to effectuate a wireless data communication session between their client computing platforms and media content streaming devices. Users may be able to control the media content streamed by the media content streaming device onto a media content display device. The access point may be connected to the media content streaming device via a dongle-type connector. Associations between media content streaming devices and client computing platforms may be maintained.

19 Claims, 7 Drawing Sheets

(51) Int. Cl.
  *H04L 29/06* (2006.01)
  *H04W 4/80* (2018.01)
  *H04N 21/6377* (2011.01)
  *H04N 21/4367* (2011.01)
  *H04W 48/20* (2009.01)

(52) U.S. Cl.
  CPC ..... *H04L 65/4092* (2013.01); *H04N 21/4367* (2013.01); *H04N 21/63775* (2013.01); *H04W 12/06* (2013.01); *H04W 4/80* (2018.02); *H04W 48/20* (2013.01)

(58) Field of Classification Search
  CPC .......... H04N 21/63775; H04L 65/4069; H04L 65/4084; H04L 65/4092
  See application file for complete search history.

(56) References Cited

U.S. PATENT DOCUMENTS

| | | | |
|---|---|---|---|
| 2009/0298535 A1 | 12/2009 | Klein | |
| 2014/0162558 A1* | 6/2014 | Dua | G06F 17/30058 |
| | | | 455/41.2 |
| 2014/0373124 A1* | 12/2014 | Rubin | H04L 67/28 |
| | | | 726/7 |
| 2015/0052222 A1 | 2/2015 | Farrell | |
| 2016/0308976 A1 | 10/2016 | Canpolat | |
| 2017/0325097 A1* | 11/2017 | Chen | H04L 67/12 |

OTHER PUBLICATIONS

International Preliminary Report on Patentability in PCT/IB2017/057672, dated Jun. 11, 2019 (12 pages).

* cited by examiner

SYSTEMS AND METHODS OF CONTROLLING MEDIA CONTENT IN A MULTI-ROOM ENVIRONMENT USING A WIRELESS COMMUNICATION DEVICE

FIELD

The present disclosure relates to systems and methods for controlling media content with a wireless device in a wireless and/or wired communication network via a media content streaming device communicatively coupled to a media content streaming gateway.

BACKGROUND

It is been known that users are increasingly using wireless mobile devices such as smart phones, tablets, and the like that provide Internet connectivity. In using these devices, users are consuming media from various sources on the Internet and on their wireless mobile devices. With the growth of media streaming cast devices like Chromecast™ and Apple TV™ users can stream data from their wireless mobile devices or the Internet.

SUMMARY

One or more aspects of the present disclosure relates to a media content control system configured to control access of authenticated users to media content streaming devices in a multi-room environment and/or other environment. The multi-room environment may include multiple users within a wireless communication network and multiple media content streaming devices associated with specific locations within the environment. For example, a user in a hotel may be able to stream media content to a media content streaming device associated with guests room using a client computing platform.

In some implementations, the system may include one or more servers, one or more client computing devices, one or more media content streaming gateways, one or more media content streaming devices, one or more media content display devices and/or other components. The one or more servers may be configured to communicate with one or more client computing devices according to a client/server architecture. The users of system may access system and/or augmented reality experiences via client computing devices (s). Server(s) may be configured to execute one or more computer program components. The computer program components may include one or more of an access component, a streaming component, a control component, a maintenance component, and/or other components.

The client computing platforms may include one or more of mobile electronic devices, smart phones, tablet PCs (Personal Computers), laptop PCs, wearable devices such as a wrist watch or an HMD (Head Mounted Display), and/or other devices.

In some implementations, server(s), client computing device(s), and/or external resources may be operatively linked via one or more electronic communication links. For example, such electronic communication links may be established, at least in part, via the network such as the Internet and/or other networks. In some implementations, server(s), client computing device(s), and/or external resources may be operatively linked via some other communication media.

The network may be configured as a wireless communication network, such as a wireless wide-area network (WWAN) or IEEE 802.11-based wireless local area network (WLAN), and/or other communication network. The Network may be configured as an open network to allow users associated with client devices(s) to temporarily access wireless communication network.

The network may be configured using wired and/or wireless technologies, including cellular networks, Ethernet, and/or other technologies. Network 103 may be configured using communication protocols including IEEE 802.11, RF, IrDA (infrared), Bluetooth, ZigBee (and other variants of the IEEE 802.15 protocol), IEEE 802.11 (any variation), IEEE 802.16 (WiMAX or any other variation), IEEE 802.20, GSM, CDMA, TDMA, GPRS, EDGE, LTE, UMTS, and/or other communication systems.

One or more access point may be configured to provide access to the network to client computing devices, media content streaming gateway, and/or other devices. Access points may be configured to allow wireless, wired, and/or other type of connection with devices. For example, the access point may be configured as a Wi-Fi router configured to provide wireless and/or wired access to the network. Authentication processes may be implemented to ensure secure and credentialed access onto the network.

One or more media content streaming gateway may be configured to be integrated with media content streaming device within the same unit. The media content streaming gateway with an integrated media content streaming device may be configured to communicatively couple to one or more access points to effectuate data communication between the media content streaming gateway, the media content streaming device, and/or other components. The media content streaming gateway may be configured to couple to the access point using wireless, wired, and/or other type of connection.

The media content streaming gateway may be configured to provide authenticated users associated with client computing devices within the network with an ability to effectuate wireless communication with an individual media streaming device, housed within the media content streaming gateway.

The media content streaming gateway may be configured to communicatively couple the media content streaming device via a connector of a dongle-type device. The media content streaming gateway may be configured to communicatively couple to the access point via a connector of the dongle-type device.

The dongle-type device may be configured to include a micro USB controller and an Ethernet controller. The micro USB controller may be configured to communicatively couple the media content streaming device. The Ethernet controller may be configured to communicatively couple to a wireless and/or wired network provider.

The dongle-type device may include a AX8877x USB chipset to 10/100 Fast Ethernet/HomePNA/HomePlug controller and/or other controller. The AX8877x dongle-type device may have embedded 28 KB SRAM for packet buffering, a USB interface to communicate with USB host controller, compliant with USB specification V1.0, V1.1 and V2.0. AX8877x dongle-type device may implements 10/100 Mbps Ethernet LAN function based on IEEE802.3, IEEE 802.3u, HomePNA standard, and/or other standards. The AX8877x dongle-type device may integrate an on-chip 10/100 Mbps Ethernet PHY. The AX8877x dongle-type device may be configured to directly receive Ethernet data may be received via the Ethernet controller from the wireless and/or wired communication network via the access point.

The media content streaming gateway may be configured to communicate with the WAN via a WAN connector and/or 2.4 GHz and 5 GHz Wi-Fi router, and/or other technology. The 2.4 GHz and 5 GHz Wi-Fi router may include WISP as an operation mode and/or other operation modes.

An electrical power flow may provide power to the media content streaming device. A power regulator may be configured to control power-on capability of the media content streaming gateway.

The media content streaming device contained within the media content streaming gateway may be configured to communicatively couple to the media content display device via a connector (e.g., an HDMI connector), and/or other connectors.

The media content streaming gateway may include one or more antenna(s). One or more antenna(s) may be configured as single-band antenna(s), dual-band antenna(s), and/or other antenna(s). One or more antenna(s) and/or other components may be configured to operate within specific frequency bands. The frequency of operation of the antenna may be limited to a fixed range of frequencies. For example, one antenna may be configured to operate in the 2.4 GHz frequency range while another antenna may configured operate in the 5 GHz frequency range. The circuitry carried by the media content streaming gateway may include a wireless transceiver coupled to one or more antenna(s) and/or other components.

The media content streaming gateway may be configured to include a power input for receiving power from an external source, such as external power supply, a local area network radio interface, a display interface, a user interface including at least one of a power switch, a printed circuit board, a non-transitory memory configured to store instructions, a processor coupled with memory, and/or other components. The circuitry of the media content streaming gateway may include a processor, a memory, a wireless transceiver, an antenna, a power source, and/or other components.

In some implementations, some components of the media content streaming gateway may provide paths by which electrical power flows to the media content streaming device eliminating the need for the media content streaming device to have its own on-board power source.

In some implementations, a user interface of the media content streaming gateway may include a power-on capability. This capability may be a switch, button, or other method of powering on and off the media content streaming gateway. In some embodiments, this capability may be configured to be accessed via the network for remote control of power-on capabilities.

In some implementations, multiple media content streaming gateways and/or media content streaming devices may be configured within a multi-room environment. A multi-room environment may a hotel, a hospital, a cruise ship, an educational institution, a business, and/or other environments. Multiple media content streaming devices may be configured within multiple locations within a multi-room environment. Individual locations or rooms within a multi-room environment may include hotel rooms in a hotel, cruise ship cabins on a cruise ship, classrooms in an educational institution, offices within a business establishment, and/or other locations.

In some implementations, the media content streaming gateway may be configured to act as an access point and provide access to the network to the client computing devices.

The media content streaming device may be configured to stream media content within network. The media content streaming device may be configured to effectuate the streamed media content onto the media content display device. One or more media content streaming device may be configured to communicatively couple with the media content display device.

The streamed media content may include media content contained on the authenticated client computing platform, a media content provider available over the Internet, and/or other media content. The streamed media content may be accessed with the authenticated client computing platforms. In some implementations, the streamed media content may be accessed with a streaming application installed on the client computing devices.

In some implementations, one or more media content streaming devices may be configured to be controlled by a network administrator via network. The administrative control upon media content streaming device may be effectuated via a wireless network connection, a wired Ethernet connection, and/or by other connection.

The media content display device may be configured to display audio and visual media content transmitted by media content streaming device and/or other devices. The media content display device may commonly be referred to as an audio/visual device (e.g., a television). One or more media content display device may be configured to include at least one of an HDMI connector, a USB connector, a tuner, auxiliary interface, a processor that controls audio and visual signal, and/or other components.

The media content display device may be configured to receive media content from client computing platforms via the media content streaming device connected to the media content display device via a High Definition Multimedia Interface (HDMI), a Universal Serial Bus (USB) and/or other connections.

In some implementations, client computing platform may be configured to control the media content displayed on the media content display device.

The access component may be configured to control user access to the network and/or other communication networks. The network may be used to access the Internet and/or other components. The access component may be configured to control user requests to access the network. Requests to access the network may be made by users via the client computing platforms associated with the users, and/or other devices. The access component may be configured to connect the client computing devices to the Internet through a wireless, wired and/or other connection to the network.

The access component may be configured to receive authenticating information from users associated with client computing platforms. The access component may be configured to authenticate users attempting to access the network by comparing authenticating information and/or other parameters received by users with information stored within the system. The access component may be configured to allow access to the Internet to users that have been successfully authenticated.

The access component may be configured to control access to the media content streaming gateway, the media content streaming device, and/or other devise. The access component may be configured to control access to the media content streaming gateway, the media content streaming device by authenticating users associated with client communication platforms that have been authenticated to the network and/or other communication networks. The access component may be configured to receive authenticating information from users associated with the client computing platforms. The access component may be configured to authenticate users attempting to access media content streaming gateway, the media content streaming device, and/or other devices by comparing authenticating information and/or other parameters received by users with information stored within the system. The access component may be configured to allow access to the media content streaming gateway, the media content streaming device, and/or other devices to users that have been successfully authenticated.

The streaming component may be configured to effectuate a wireless data transmission via the media content streaming device, and/or other transmissions. The streaming component may be configured to transmit audio visual signals (media content) corresponding to specified HDMI signals and process the media content for transmission to the media content display device. The streaming component may be configured to effectuate transmission of media content from authenticated client computing platform wirelessly connected to the media content streaming device via the network. The streaming component may be configured to effectuate transmission of the media content from the Internet over the network.

The streaming component may be configured to effectuate media content transmission via the media content streaming device coupled to the media content streaming gateway, as described elsewhere in this disclosure. The coupling of the media streaming device to the media content streaming gateway which in turn is communicatively coupled to the network via the Ethernet connector may be configured to control access to the media content streaming device to users associated with the client computing platform that have been authenticated onto the network by the access component, and/or other components.

The streaming component may be configured to manage and/or control media content streaming gateways, media content streaming devices, and/or other devices. The streaming component may be configured to maintain associations between individual media content streaming gateways and locations within a multi-room environment. One or more media content streaming gateway may be associated with one or more locations. Associations between media content streaming gateway and location may be one or more of one-to-one, many-to-one, one-to-many, many-to-many, and/or other associations. The streaming component may be configured to control access between authenticated users at a specific location within the network and the media content streaming gateway associated with the location user has authenticated into.

The control component may be configured to effectuate control of the media content displayed on the media content display device that has been transmitted via the media content streaming device. The control component may be configured to allow users associated with authenticated client computing platforms to interact with media content displayed on the media content display device. The control component may be configured to allow user to select media content using the client computing device.

The control component may be configured to effectuate control of media content displayed on the media content display device that has been transmitted via the media content streaming device originating from client computing platform. Users may interact with the media content streaming device originating from client computing platform by selecting a particular media content (e.g., a movie, a video, a photo album), by effectuating additional input to the selected media content (e.g., flipping through pictures of the photo album), and/or other controls.

The control component may be configured to effectuate control of media content displayed on the media content display device that has been transmitted via the media content streaming device originating from media content provider available over the Internet. Users may interact with the media content streaming device originating from the Internet by selecting a particular media content (e.g., a movie, a video, a video game), by effectuating additional input to the selected media content (e.g., interacting with characters within the video game), and/or other controls.

In some implementations, the control component may be configured to effectuate control of media content displayed on the media content display device that has been transmitted via the media content streaming device by the network administrator. The control component may be configured to allow users associated with authenticated client computing platforms to interact with media content displayed on the media content display device.

The control component may be configured to effectuate control of media content displayed on the media content display device that has been transmitted via the media content streaming device by facilitating interaction between users and the media content. For example, the control component may be configured to include a user interface configured to receive user input from the user. The received user input may indicate a selectable image, a selectable command, a textual information, a textual command, a voice command, and/or other information that facilitates entry or selection of media control information by the user. By way of non-limiting example, user input may be received through a client application on the wireless communication device. An input device may include a key entry device, a touch entry device, an imaging device, a sound device, and/or other input devices.

For example, the control component may cause the user interface to display selectable icons corresponding to various movies available for viewing. Responsive to the user selecting one of the displayed icons, control component may obtain media content associated with the selected icons. As another example, control component may obtain media content information that corresponds to the title, cast, and description of the movie and/or other information.

The maintenance component may be configured to manage and/or control media content streaming devices, access points, and/or other devices. The maintenance component may be configured to maintain authentication information and/or parameters used to authenticate users associated with client computing platforms to connect to the media content streaming gateway, the media content streaming device, and/or other device. The maintenance component may be configured to access the media content streaming gateway by virtue of the media content streaming gateway being communicatively coupled to an access point and connected to the network. The maintenance component may be configured to access the media content streaming gateway using WAN, LAN, and/or other type of connection.

The maintenance component may be configured to manage associations between the users within network and media content streaming devices. The maintenance component may be configured to automatically update and/or reset authentication information and/or parameters used to access media content streaming gateway associated with a specific location in a multi-room environment based on occurrence of certain events and/or other triggers.

The maintenance component may be configured to monitor power usage and/or other information associated with the media content streaming gateway. media content streaming device, and/or other devices. The maintain component may be configured to obtain input from a power regulator within the media content streaming gateway and/or other component and evaluate the media content streaming device power usage. The power usage evaluation may include a determination whether a power disruption exists within the media content streaming gateway, the media content streaming device, and/or other devices. The maintenance component may be configured to communicate power status and/or other information associated with the media content streaming gateway, the media content streaming device, and/or other devices. Maintenance component may be configured to transmit and display a status notification. The power status notification may be displayed on an administrative user interface associated with the client computing platform and/or other devise.

The maintenance component may be configured to monitor wireless communications within the network. The maintenance component may be configured to determine whether disruption within wireless communications within the network may have occurred. Maintenance component may be configured to communicate network status and/or other information. The maintenance component may be configured to transmit and display a network status notification. The network status notification may be displayed on an administrative user interface associated with the client computing platform and/or other devise.

The maintenance component may be configured to effectuate monitoring and/or control of media content streaming devices, access points, and/or other devices by facilitating interaction between network administrators and the devices. For example, the maintenance component may be configured to include a user interface configured to display status information to and receive input from the network administrator. The displayed status information may include power usage information, authentication information, network information, and/or other information. The received network administer input may indicate a selectable image, a selectable command, a textual information, a textual command, a voice command, and/or other information that facilitates entry or selection of device control information by the network administrator. Device control information may include power usage information, authentication information, network information, and/or other information. By way of non-limiting example, network administrator input may be received through a client application on the wireless communication device. An input device may include a key entry device, a touch entry device, an imaging device, a sound device, and/or other input devices.

For example, the maintenance component may cause the user interface to display selectable icons corresponding to various media content streaming devices available within the network. Responsive to the user selecting one of the displayed icons, control component may obtain password information associated with the selected media content streaming device. Network administrator may use the user interface to reset the password on the media content streaming device, to power-on the media content streaming devices, and/or perform other functions.

In some implementations, the maintenance component may be configured to collect, store, analyze and/or perform other functions with a data communicated by users associated with the client computing platform to the media content streaming device. The data may include media content selected from the client computing platform, media content selected from the Internet, user instructions, and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
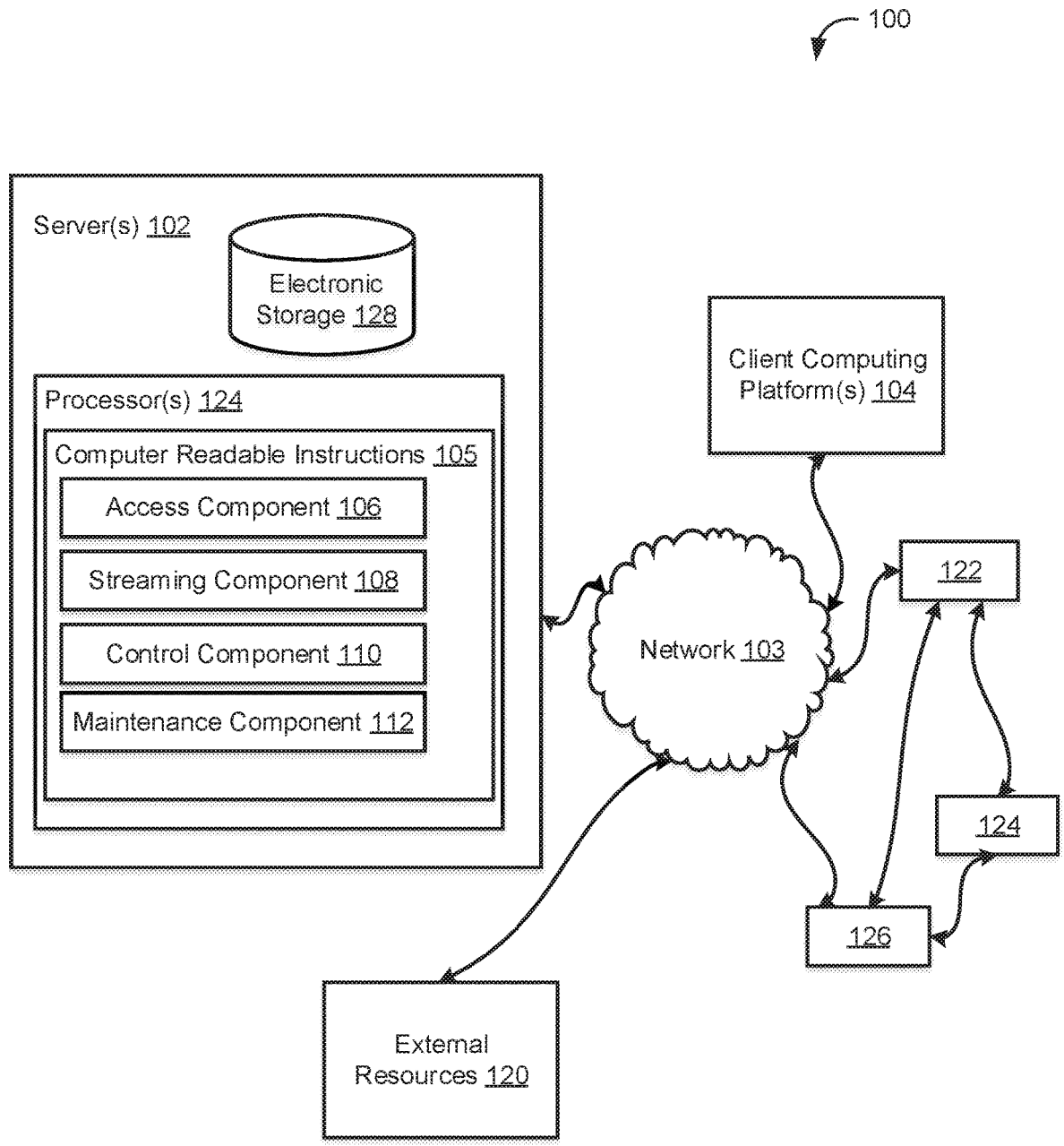
FIG. 1 illustrates system for controlling media content with a client computing platform in a wireless communication network via a media content streaming device communicatively coupled to a media content streaming gateway, in accordance with one or more implementations.

FIG. 1 illustrates a multi-room media content control system 100, in accordance with one or more implementations. As is illustrated in FIG. 1, system 100 may include one or more of one or more servers 102, one or more client computing devices 104, one or more media content streaming gateways 122, one or more media content streaming devices 124, one or more media content display devices 126, and/or other components.

Server(s) 102 may be configured to communicate with one or more client computing device(s) 104 according to a client/server architecture. The users of system 100 may access system 100 via client computing devices(s) 104 associated with the users. Server(s) 102 may include one or more physical processors 124, and/or other components. The one or more physical processors 124 may be configured by machine-readable instructions 105. Executing the machine-readable instructions 105 may cause server(s) 102 to facilitate generating augmented reality experiences. Machine-readable instructions 105 may include one or more computer program components. The computer program components may include one or more of access component 106, streaming component 108, control component 110, maintenance component 112, and/or other components.

In some implementations, client computing device(s) 104 may include one or more of a smartphone, a tablet, a mobile device, and/or other devices. A given client computing device(s) 104 may include one or more of one or more processors configured by machine-readable instructions, and/or other components. Machine-readable instructions of a client computing device may include computer program components. The computer program components may be configured to enable a user associated with the given client computing device(s) 104 to interface with system 100, access point and/or external resources 120, and/or provide other functionality attributed herein to client computing device(s) 104 and/or server(s) 102.

In some implementations, server(s) 102, client computing device(s) 104, and/or external resources 120 may be operatively linked via one or more electronic communication links. For example, such electronic communication links may be established, at least in part, via network 103 such as the Internet and/or other networks. In some implementations, server(s) 102, client computing device(s) 104, and/or external resources 120 may be operatively linked via some other communication media.

Network 103 may be configured as a wireless communication network, such as a wireless wide-area network (WWAN) or IEEE 802.11-based wireless local area network (WLAN), and/or other communication network. Network 103 may be configured as an open network to allow users associated with client devices(s) 104 to temporarily access wireless communication network.

Network 103 may be configured using wired and/or wireless technologies, including cellular networks, Ethernet, and/or other technologies. Network 103 may be configured using communication protocols including IEEE 802.11, RF, IrDA (infrared), Bluetooth, ZigBee (and other variants of the IEEE 802.15 protocol), IEEE 802.11 (any variation), IEEE 802.16 (WiMAX or any other variation), IEEE 802.20, GSM, CDMA, TDMA, GPRS, EDGE, LTE, UMTS, and/or other communication systems.

One or more access point may be configured to provide access to network 103 to client computing devices 104, media content streaming gateway 122, and/or other devices. Access points may be configured to allow wireless, wired, and/or other type of connection with devices. For example, the access point may be configured as a Wi-Fi router configured to provide wireless and/or wired access to network 103. Authentication processes may be implemented to ensure secure and credentialed access onto network 103.

One or more media content streaming gateway 122 may be configured to be integrated with media content streaming device 124 within the same unit. Media content streaming gateway 122 with integrated media content streaming device 124 may be configured to communicatively couple to one or more access points to effectuate data communication between media content streaming gateway 122, media content streaming device 124, and/or other components. Media content streaming gateway 122 may be configured to couple to the access point using wireless, wired, and/or other type of connection.

Media content streaming gateway 122 may be configured to provide authenticated users associated with client computing devices 104 within network 103 with an ability to effectuate wireless communication with an individual media streaming device, such as media streaming device 124, housed within media content streaming gateway 122.

Figure 2:
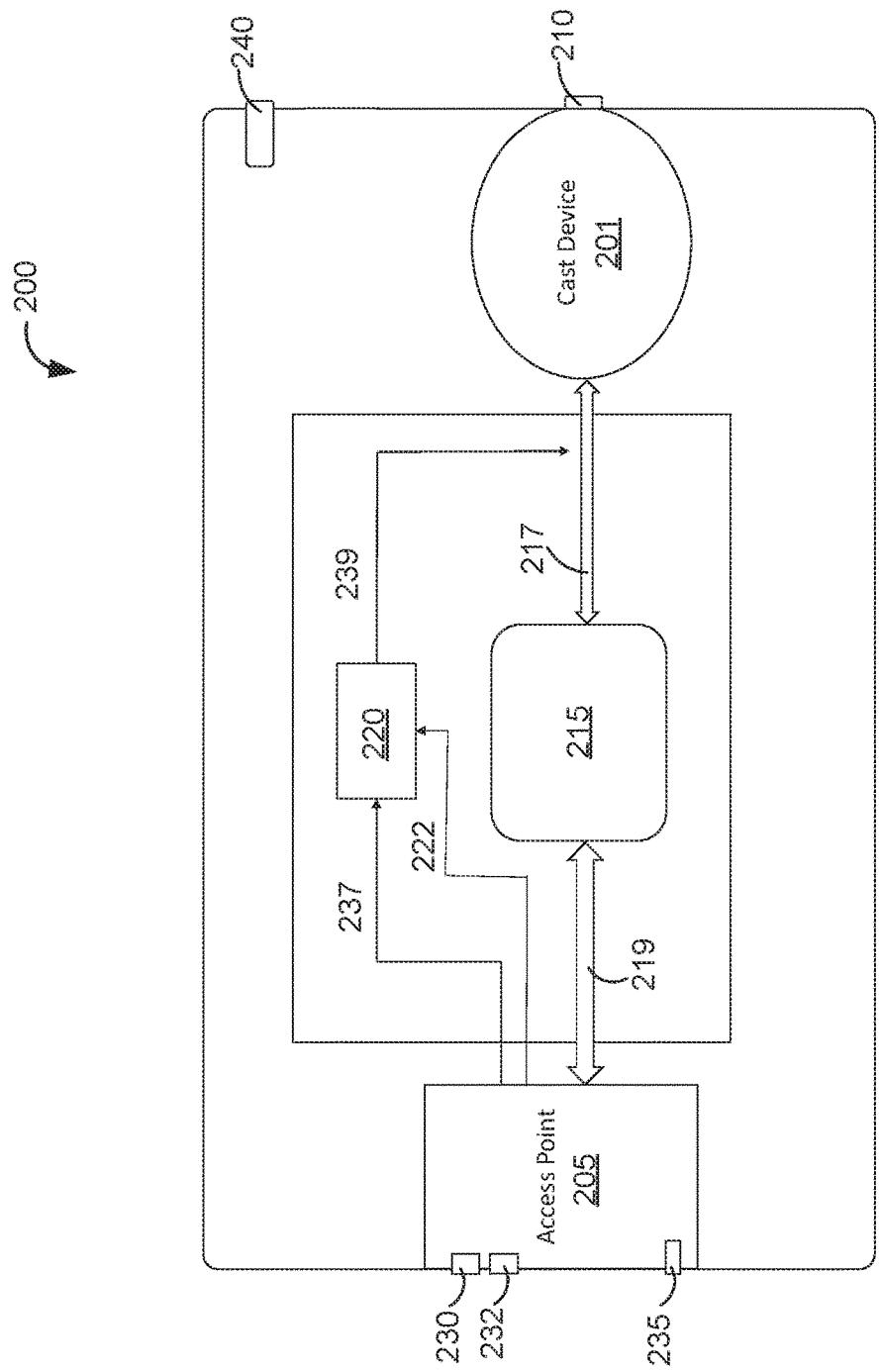
FIG. 2 illustrates a schematic of a media content streaming gateway with a communicatively coupled media content streaming device, in accordance with one or more implementations.

Referring to FIG. 2, a schematic illustrates media content streaming gateway 200 configured to provide authenticated users within a wireless and/or wired network access to media content streaming device 201. Media content streaming gateway 200 may be configured to communicatively couple media content streaming device 201 via 217 connector of dongle-type device 215. Media content streaming gateway 200 may be configured to communicatively couple to access point 205 via 219 connector of dongle-type device.

Dongle-type device 215 may be configured to include micro USB controller 217 and Ethernet controller 219. Micro USB interface 217 may be configured to communicatively couple media content streaming device 201. Ethernet controller 219 may be configured to communicatively couple to access point 205.

Dongle-type device 215 may include a AX8877x USB chipset to 10/100 Fast Ethernet/HomePNA/HomePlug controller and/or other controller. The AX8877x dongle-type device may have embedded 28 KB SRAM for packet buffering, a USB interface to communicate with USB host controller, compliant with USB specification V1.0, V1.1 and V2.0. AX8877x dongle-type device may implements 10/100 Mbps Ethernet LAN function based on IEEE802.3, IEEE 802.3u, HomePNA standard, and/or other standards. The AX8877x dongle-type device may integrate an on-chip 10/100 Mbps Ethernet PHY. The AX8877x dongle-type device may be configured to directly receive Ethernet data may be received via Ethernet controller 219 from wireless and/or wired communication network via access point 205.

Media content streaming gateway 122 may be configured to communicate with the WAN via WAN connector 230. Media content streaming gateway 122 may be configured to communicate with the LAN via LAN connector 232.

Electrical power flow 237 may provide power to media content streaming device 201. Power regulator 220 may be configured to control power-on capability of media content streaming device 201.

Media content streaming device 201 contained within media content streaming gateway 200 may be configured to communicatively couple to a media content display device via connector 210. Connector 210 may be an HDMI connector and/or other connector.

Antenna 240 may be configured within media content streaming gateway 200. The circuitry carried by media content streaming gateway 200 may include a wireless transceiver coupled to antenna 240, antenna 240, and/or other components. Antenna 240 and/or other components may be configured to operate within specific frequency bands. Antenna 240 may be configured as a dual-band frequency antenna. Antenna 240 may be configured to operate in the 2.4 GHz and 5 GHz frequency bands.

Referring back to FIG. 1, media content streaming gateway 122 may be configured to a power input for receiving power from an external source, such as external power supply, a local area network radio interface, a display interface, a user interface including at least one of a power switch, a printed circuit board, a non-transitory memory configured to store instructions, a processor coupled with memory, and/or other components. The circuitry of media content streaming gateway 122 may include a processor, a memory, a wireless transceiver, an antenna, a power source, and/or other components.

Figure 3A:
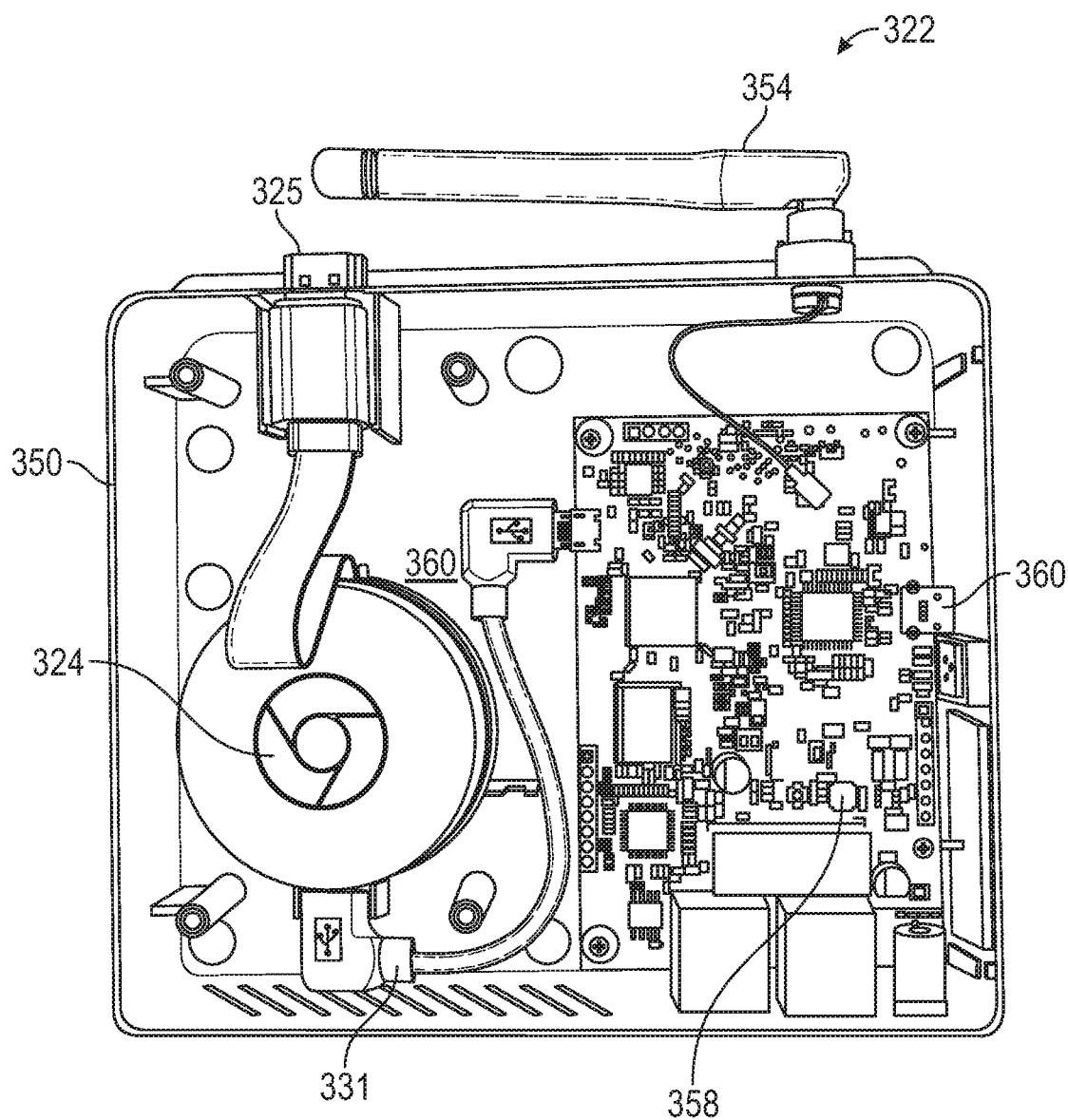
FIG. 3A illustrates an exemplary media content streaming gateway with a communicatively coupled media content streaming device, in accordance with one or more implementations.
Figure 3B:
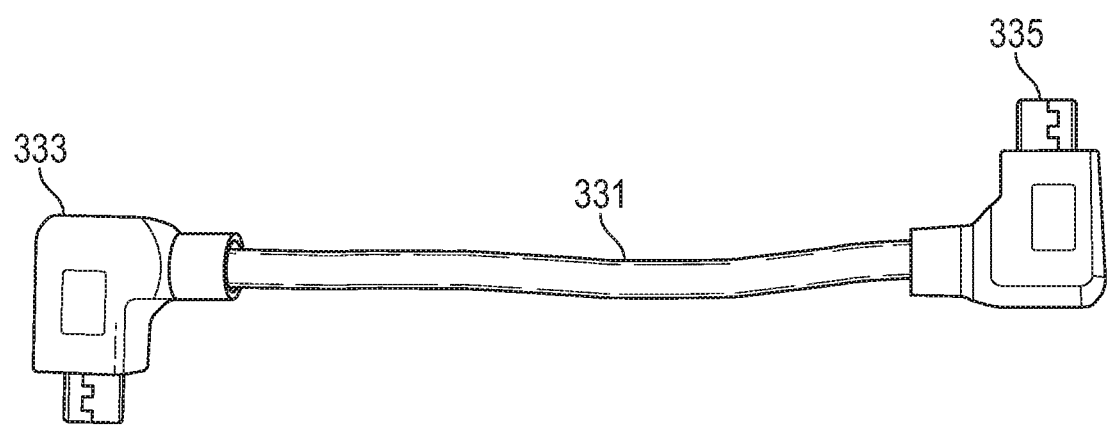
FIG. 3B illustrates an exemplary dongle-type connector used to communicatively couple a media content streaming device within a media content streaming gateway, in accordance with one or more implementations.

For example, FIG. 3A illustrates an exemplary media content streaming gateway 322. Media content streaming gateway may be enclosed in a housing 350. Media content streaming gateway 322 may include media content streaming device 324, dongle-type device 331 connecting media content streaming device 324, Ethernet connector 360, HDMI connector 325, a power input, local area network radio interface(s) 354, a power switch, non-transitory memory and processor 358, and/or other components. Within housing 350 of media content streaming gateway 322, media content streaming device 324 may be communicatively coupled via a dongle-type device 331 to one or more components within media content streaming gateway 322. As illustrated in FIG. 3B, dongle-type device 331 may include, micro USB connector 333, micro USB connector 335, and/or other connectors.

Referring back to FIG. 1, in some implementations, some components of media content streaming gateway 122 may provide paths by which electrical power flows to media content streaming device 124 eliminating the need for media content streaming device 124 to have its own on-board power source.

In some implementations, a user interface of media content streaming gateway 122 may include a power-on capability. This capability may be a switch, button, or other method of powering on and off media content streaming gateway 122. In some embodiments, this capability may be configured to be accessed via network 103 for remote control of power-on capabilities.

In some implementations, multiple media content streaming gateways and/or media content streaming devices may be configured within a multi-room environment. A multi-room environment may a hotel, a hospital, a cruise ship, an educational institution, a business, and/or other environments. Multiple media content streaming devices may be configured within multiple locations within a multi-room environment. Individual locations or rooms within a multi-room environment may include hotel rooms in a hotel, cruise ship cabins on a cruise ship, classrooms in an educational institution, offices within a business establishment, and/or other locations.

In some implementations, media content streaming gateway 122 may be configured to act as an access point and provide access to network 103 to client computing devices 104.

In some implementations, individual media content streaming gateways 122 may be configured to provide services to more than one room or location within a multi-room environment. Alternatively, multiple media content streaming gateways may be servicing a single location. In some implementations, individual media content streaming gateways 122 may have multiple radios, each available to serve a different guest or communication need.

Media content streaming device 124 may be configured to stream media content within network 103. Media content streaming device 124 may be configured to effectuate the streamed media content onto media content display device 126. One or more media content streaming device 124 may be configured to communicatively couple with media content display device 126. In some implementations, media content streaming device 124 may be directly connected to media content display device 126 via an HDMI, a Universal Serial Bus (USB), and/or other connections. In some implementations, media content streaming devices 124 may be connected to media content display device 126 via a cable interface (e.g., Mobile High-Definition Link (MHL) cable interface), and/or other interface. Media content streaming device 124 may be communicatively coupled to media content streaming gateway 122. In some implementations, media content display device 124 may be configured to be housed outside of media content streaming gateway 122.

Streamed media content may include media content contained on authenticated client computing platform 104, a media content provider available over the Internet, and/or other media content. Streamed media content may be accessed with authenticated client computing platforms 104. In some implementations, streamed media content may be accessed with a streaming application installed on client computing devices 104.

In some implementations, one or more media content streaming device 124 may be configured to be controlled by a network administrator via network 103. The administrative control upon media content streaming device 124 may be effectuated via a wireless network connection, a wired Ethernet connection, and/or by other connection.

Media content display device 126 may be configured to display audio and visual media content transmitted by media content streaming device 124 and/or other devices. Media content display device 126 may commonly be referred to as an audio/visual device (e.g., a television). One or more media content display device 126 may be configured to include at least one of an HDMI connector, a USB connector, a tuner, auxiliary interface, a processor that controls audio and visual signal, and/or other components.

Media content display device 126 may be configured to receive media content from client computing platforms 104 via media content streaming device 124 connected to media content display devices 126 via a High Definition Multimedia Interface (HDMI), a Universal Serial Bus (USB) and/or other connections.

In some implementations, client computing platforms 104 may be configured to control the media content displayed on media content display device 126.

Referring back to FIG. 1, external resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

Access component 106 may be configured to control user access to network 103 and/or other communication networks. Network 103 may be used to access the Internet and/or other components. Access component 106 may be configured to control user requests to access network 103. Requests to access network 103 may be made by users via client computing platforms 104 associated with the users, and/or other devices. Access component 106 may be configured to connect client computing devices 104 to the Internet through a wireless, wired and/or other connection to network 103.

Access component 106 may be configured to receive authenticating information from users associated with client computing platforms 104. Access component 106 may be configured to authenticate users attempting to access network 103 by comparing authenticating information and/or other parameters received by users with information stored within system 100. Access component 106 may be configured to allow access to the Internet to users that have been successfully authenticated.

Access component 106 may be configured to control access to media content streaming gateway 122, media content streaming device 124, and/or other devise. Access component 106 may be configured to control access to media content streaming gateway 122, media content streaming device 124 by authenticating users associated with client communication platforms 104 that have been authenticated to network 103 and/or other communication networks. Access component 106 may be configured to receive authenticating information from users associated with client computing platforms 104. Access component 106 may be configured to authenticate users attempting to access media content streaming gateway 122, media content streaming device 124, and/or other devices by comparing authenticating information and/or other parameters received by users with information stored within system 100. Access component 106 may be configured to allow access to media content streaming gateway 122, media content streaming device 124, and/or other devices to users that have been successfully authenticated.

In some implementations, access component 106 may be configured to require that users enter authentication information and/or other parameters to authenticate and establish a wireless connection to media content streaming gateway 122 via client computing platforms 104. In some implementations, access component 106 may be configured to require that users enter authentication information and/or other parameters to a web browser of the client computing platform 104. Authentication information may include password, user name, and/or other authenticating information. Other parameters may include user name, user location, payment information, and/or other information.

By way of non-limiting illustration, guests in a multi-room hotel may wish to access hotel's wireless network using their wireless devices. Guests attempting to access a wireless communication network in their hotel room within the hotel may have to establish a wireless network connection with one or more access points. Upon establishing the connection, guests may be asked to provide authenticating information to obtain access to the Internet, a media content streaming gateway, a media content streaming device, and/or other services and/or components. Guests may receive a user name, a password, and/or other authenticating information upon check-in at a hotel front desk. Guests may configure their client computing devices with the authenticating information provided by the hotel. Upon entering their room, a guest may use a browser on their client computing platform to connect to and access a wireless network of the hotel, whereupon the guest could enter their name and room number for further authentication. Upon authentication, guests may be able to access the Internet. Guests may be able to access media content streaming gateway 122, media content streaming device 124, and/or other devices.

Streaming component 108 may be configured to effectuate a wireless and/or wired data transmission via media content streaming device 124, and/or other transmissions. Streaming component 108 may be configured to transmit audio visual signals (media content) corresponding to specified HDMI signals and process the media content for transmission to media content display device 124. Streaming component 108 may be configured to effectuate transmission of media content from authenticated client computing platform 104 wirelessly connected and/or wired to media content streaming device 124 via network 103. Streaming component 108 may be configured to effectuate transmission of media content from the Internet over network 103.

Streaming component 108 may be configured to effectuate media content transmission via media content streaming device 124 coupled to media content streaming gateway 122, as described elsewhere in this disclosure. The coupling of the media streaming device 124 to media content streaming gateway 122 which in turn is communicatively coupled to network 103 via Ethernet connector may be configured to control access to media content streaming device 124 to users associated with client computing platform 104 that have been authenticated onto network 103 by access component 106, and/or other components.

Streaming component 108 may be configured to manage and/or control media content streaming gateways, media content streaming devices, and/or other devices. Streaming component 108 may be configured to maintain associations between individual media content streaming gateways and locations within a multi-room environment. One or more media content streaming gateway may be associated with one or more locations. Associations between media content streaming gateway and location may be one or more of one-to-one, many-to-one, one-to-many, many-to-many, and/or other associations. Streaming component 108 may be configured to control access between authenticated users at a specific location within network 103 and media content streaming gateway 122 associated with the location user has authenticated into.

By way of non-limiting illustration, a guest in a hotel may be provided with authentication information upon check-in. Upon entering a designated room, the guest may access hotel's wireless network by providing authentication information and/or other authentication parameters (e.g., guest name, guest room number, and/or other information). A media content streaming gateway communicatively coupled to a hotel's wireless and/or wired network via a WAN connector may be associated with a certain room number. By authenticating onto hotel's wireless and/or wired network, the guest may be able to connect to media content streaming device coupled to a media content streaming gateway associated with guest's room. Authentication information and/or parameters provided by the guest matched the authentication parameters stored within media content streaming gateway. Thus, only users that provide necessary authentication information and/or parameters may be able to establish a wireless and/or wired connection to a mobile content streaming device, for example, for streaming media content purposes. While other guests may be able to authenticate onto hotel's wireless and/or wired network using their wireless communication devices they may not be able to access specific mobile content streaming gateways and mobile content streaming devices coupled to mobile content streaming gateways for lack of additional authentication parameters, such as guest name, guest room, and/or other authentication parameters.

Control component 110 may be configured to effectuate control of media content displayed on media content display device 126 that has been transmitted via media content streaming device 124. Control component 110 may be configured to allow users associated with authenticated client computing platforms 104 to interact with media content displayed on media content display device 126. Control component 110 may be configured to allow user to select media content using client computing device 104.

Control component 110 may be configured to effectuate control of media content displayed on media content display device 126 that has been transmitted via media content streaming device 124 originating from client computing platform. Users may interact with media content streaming device 124 originating from client computing platform by selecting a particular media content (e.g., a movie, a video, a photo album), by effectuating additional input to the selected media content (e.g., flipping through pictures of the photo album), and/or other controls.

Control component 110 may be configured to effectuate control of media content displayed on media content display device 126 that has been transmitted via media content streaming device 124 originating from media content provider available over the Internet. Users may interact with media content streaming device 124 originating from the Internet by selecting a particular media content (e.g., a movie, a video, a video game), by effectuating additional input to the selected media content (e.g., interacting with characters within the video game), and/or other controls.

In some implementations, control component 110 may be configured to effectuate control of media content displayed on media content display device 126 that has been transmitted via media content streaming device 124 by facilitating interaction between users and the media content. For example, control component 110 may be configured to include a user interface configured to receive user input from the user. The received user input may indicate a selectable image, a selectable command, a textual information, a textual command, a voice command, and/or other information that facilitates entry or selection of media control information by the user. By way of non-limiting example, user input may be received through a client application on the wireless communication device. An input device may include a key entry device, a touch entry device, an imaging device, a sound device, and/or other input devices.

Figure 4:
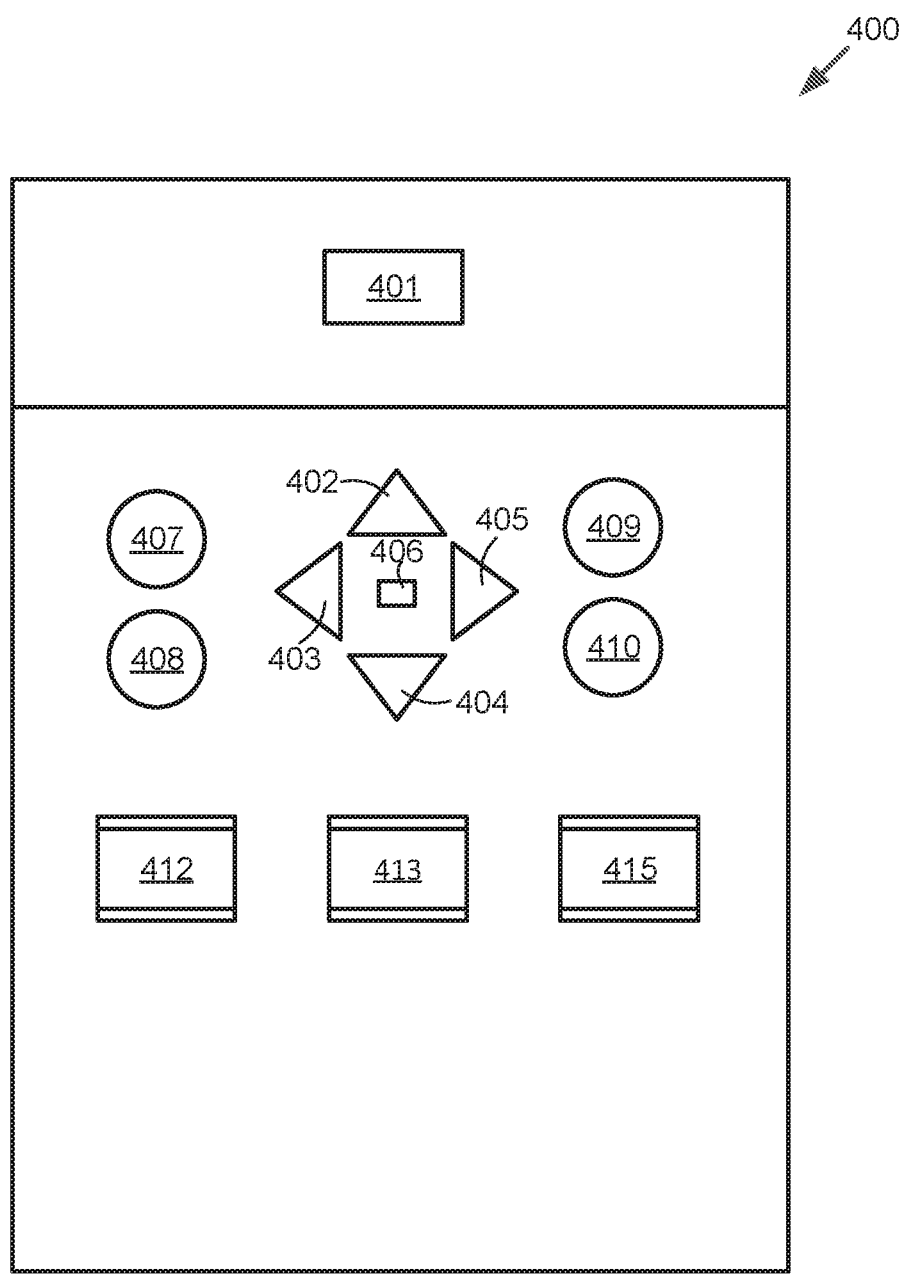
FIG. 4 illustrates an exemplary user interface used controlling media content in a wireless communication network, in accordance with one or more implementations.

By way of illustration and non-limiting example, FIG. 4 illustrates an exemplary user interface 400 that may be used to control media content displayed on a media content display device. User interface 400 may include user interface fields that allow a user to provide user input that is received by control component 110 and/or other components of system 100. The user interface fields may include a textual command field 401, selection fields 402, 403, 404, 405, action field 406, volume level adjustment fields 407, 408, channel adjustment fields 409, 410, menu field 412, guide field 413, Netflix field 415, and/or other user interface fields.

Textual command field 401 may allow the a user to enter textual, voice, and/or other information when controlling media content. For example, a user may select field 401 and speak "room service" to bring a hotel's room service menu. Selection fields 402, 403, 404, and 405 may correspond to allowing a user to select specific media content during review, browsing and/or while performing other functions. For example, a user may be interested in selecting a particular movie from a movie list and may use selection field 402 to go up to the particular movie within the movie list. Volume level adjustment fields 407 and 408 may correspond to allowing a user to increase or decrease a volume of an audio output of the media content display device. For example, volume level adjustment field 407 may correspond to allowing user to increase the volume. Channel adjustment fields 409 and 410 may correspond to a channel adjustment within a channel guide, a channel menu, and/or other menu. Menu field 412 may correspond to allowing a user to view a menu associated with media content. For example, the menu may include hotel services, games, cable TV, streaming content, and/or other information. Guide field 413 may correspond to allowing a user to view a channel guide associated with media content representing cable TV and/or other information. Netflix field 415 may correspond to allowing a user to view a media content associated with Netflix provider. A user may confirm the selection and/or effectuate media content control command in accordance with user-provided input through fields 401-415 through action field 406.

Referring back to FIG. 1, in some implementations, control component 110 may be configured to effectuate control of media content displayed on media content display device 126 that has been transmitted via media content streaming device 124 by the network administrator. Control component 110 may be configured to allow users associated with authenticated client computing platforms 104 to interact with media content displayed on media content display device 126. For example, a hotel guest may use their wireless communication device to interact with media content presented by the hotel. Hotel media content may include room service options, in-room dining services, restaurant reservation services, check-out services, payment services, reservation services, and/or other hotel services. Guest may be able to interact with information related to services from the available hotel services by selecting a specific service, ordering room servicer, entering payment information, providing check-out information, extending reservations, sending a notification to hotel administration and/or other interactions.

Maintenance component 112 may be configured to manage and/or control media content streaming devices, access points, and/or other devices. Maintenance component 112 may be configured to maintain authentication information and/or parameters used to authenticate users associated with client computing platforms 104 to connect to media content streaming gateway 122, media content streaming device 124, and/or other device. Maintenance component 112 may be configured to access media content streaming gateway 122 by virtue of media content streaming gateway 122 being communicatively coupled to an access point and connected to network 103. Maintenance component 112 may be configured to access media content streaming gateway 122 using WAN, LAN, and/or other type of connection.

Maintenance component 112 may be configured to manage associations between authenticated users within network 103 and media content streaming devices 124. Maintenance component 112 may be configured to automatically update and/or reset authentication information and/or parameters used to access media content streaming gateway 122 associated with a specific location in a multi-room environment based on occurrence of certain events and/or other triggers.

By way of non-limiting illustration, a guest in a hotel may be issued a user name and password for accessing hotel's wireless network. This user name and password issued by the hotel at check-in may also be configured by maintenance component 112 as the same authenticating parameters for accessing media content streaming gateway 122 associated with guest's room. Once user checks-out of the hotel, maintenance component 112 may be configured to remove the authentication parameters associated with that users from accessing media content streaming gateway 122.

Maintenance component 112 may be configured to monitor power usage and/or other information associated with media content streaming gateway 122. media content streaming device 124, and/or other devices. Maintain component 112 may be configured to obtain input from a power regulator within media content streaming gateway 122 and/or other component and evaluate media content streaming device 124 power usage. The power usage evaluation may include a determination whether a power disruption exists within media content streaming gateway 122, media content streaming device 122, and/or other devices. Maintenance component 112 may be configured to communicate power status and/or other information associated with media content streaming gateway 122, media content streaming device 124, and/or other devices. Maintenance component 112 may be configured to transmit and display a status notification. The power status notification may be displayed on an administrative user interface associated with client computing platform 104 and/or other devise.

Maintenance component 112 may be configured to monitor wireless and/or wired communications within network 103. Maintenance component 112 may be configured to determine whether disruption within wireless and/or wired communications within network 103 may have occurred. Maintenance component 112 may be configured to communicate network status and/or other information. Maintenance component 112 may be configured to transmit and display a network status notification. The network status notification may be displayed on an administrative user interface associated with client computing platform 104 and/or other devise.

In some implementations, the maintenance component 112 may be configured to effectuate monitoring and/or control of media content streaming devices, access points, and/or other devices by facilitating interaction between network administrators and the devices. For example, maintenance component 112 may be configured to include a user interface configured to display status information to and receive input from the network administrator. The displayed status information may include power usage information, authentication information, network information, and/or other information. The received network administer input may indicate a selectable image, a selectable command, a textual information, a textual command, a voice command, and/or other information that facilitates entry or selection of device control information by the network administrator. Device control information may include power usage information, authentication information, network information, and/or other information. By way of non-limiting example, network administrator input may be received through a client application on the wireless and/or wired communication device. An input device may include a key entry device, a touch entry device, an imaging device, a sound device, and/or other input devices.

Figure 5:
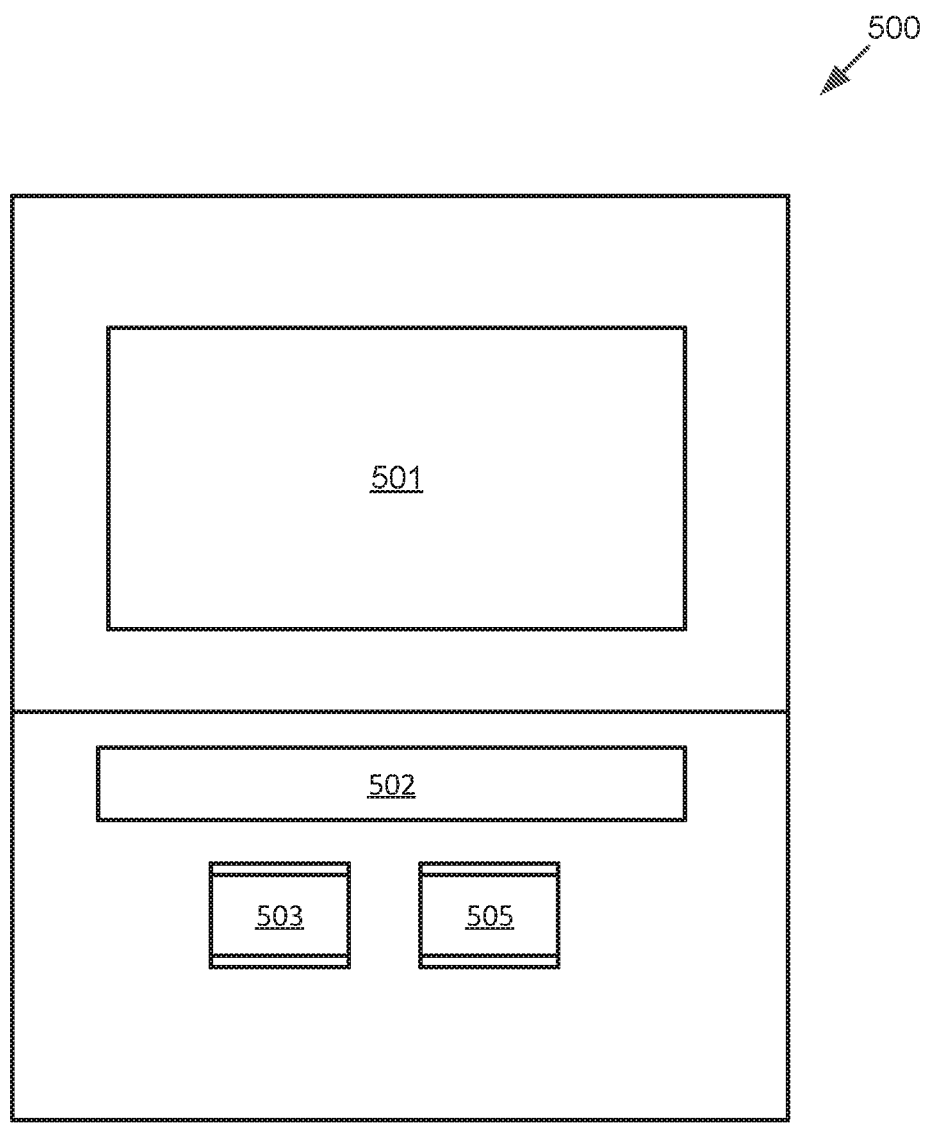
FIG. 5 illustrates an exemplary user interface used for monitoring and controlling media content streaming device, in accordance with one or more implementations.

By way of illustration and non-limiting example, FIG. 5 illustrates an exemplary user interface 500 that may be used to control and monitor media content streaming devices, access points, and/or other devices by facilitating interaction between network administrators and the devices. User interface 500 may include user interface display fields that allow a network administrator to view status information effectuated by maintenance component 112 and/or other components of system 100.

User interface 500 may include user interface fields that allow a network administrator to provide input that is received by maintenance component 112 and/or other components of system 100. The user interface fields may include a display field 501, textual command field 502, authentication field 503, reset field 505, and/or other user interface fields.

Display field 501 may allow the network administrator to view status information including power usage information, authentication information, network information. For example, the network administrator may receive notification displayed in display field 501 in an event of a certain media content streaming device being powered off. Textual command field 502 may allow the a network administrator to enter textual, voice, and/or other information when controlling and maintaining media content streaming devices, access points, and/or other devices. For example, a network administrator may select field 502 and speak "provide status" to receive status information on certain device within the network. Authentication field 503 may be configured to allow a network administrator to modify authentication information for accessing media content streaming devices, associate media content with locations in a multi-room environment, and/or other functions. For example, a network administrator may select field 503 to reset a password associated with a certain media content streaming devices in response to a hotel guest checking out of the hotel. Reset field 505 may be configured to allow a network administrator to re-power certain media content streaming device and/or other functions. For example, a network administrator may select field 505 to re-power a media content streaming device in response to a notification that that media content streaming device has been powered off.

In some implementations, maintenance component 112 may be configured to collect, store, analyze and/or perform other functions with a data communicated by users associated with client computing platform 104 to media content streaming device 124. The data may include media content selected from client computing platform 104, media content selected from the Internet, user instructions, and/or other information.

In some implementations, server(s) 102, client computing device(s) 104, and/or external resources 120 may be operatively linked via one or more electronic communication links. For example, such electronic communication links may be established, at least in part, via a network 103 such as the Internet and/or other networks. It will be appreciated that this is not intended to be limiting, and that the scope of this disclosure includes implementations in which server(s) 102, client computing device(s) 104, and/or external resources 120 may be operatively linked via some other communication media.

External resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

Server(s) 102 may include electronic storage 128, one or more processors 124, and/or other components. Server(s) 102 may include communication lines, or ports to enable the exchange of information with a network and/or other computing devices. Illustration of server(s) 102 in FIG. 1 is not intended to be limiting. Servers(s) 102 may include a plurality of hardware, software, and/or firmware components operating together to provide the functionality attributed herein to server(s) 102. For example, server(s) 102 may be implemented by a cloud of computing devices operating together as server(s) 102.

Electronic storage 128 may include electronic storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 128 may include one or more virtual storage resources (e.g., cloud storage, a virtual private network, and/or other virtual storage resources). Electronic storage 128 may store software algorithms, information determined by processor(s) 124, information received from server(s) 102, information received from client computing device(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same client computing device, or processor(s) 124 may represent processing functionality of a plurality of devices operating in coordination. The processor(s) 124 may be configured to execute computer readable instruction components 106, 108, 110, 112, and/or other components. The processor(s) 124 may be configured to execute components 106, 108, 110, 112, and/or other components by software; hardware; firmware; some combination of software, hardware, and/or firmware; and/or other mechanisms for configuring processing capabilities on processor(s) 124.

It should be appreciated that although components 106, 108, 110, and 112 are illustrated in FIG. 1 as being co-located within a single processing unit, in implementations in which processor(s) 124 includes multiple processing units, one or more of components 106, 108, 110, and/or 112 may be located remotely from the other components. The description of the functionality provided by the different components 106, 108, 110, and/or 112 described herein is for illustrative purposes, and is not intended to be limiting, as any of components 106, 108, 110, and/or 112 may provide more or less functionality than is described. For example, one or more of components 106, 108, 110, and/or 112 may be eliminated, and some or all of its functionality may be provided by other ones of components 106, 108, 110, and/or 112. As another example, processor(s) 124 may be configured to execute one or more additional components that may perform some or all of the functionality attributed herein to one of components 106, 108, 110, and/or 112.

Figure 6:
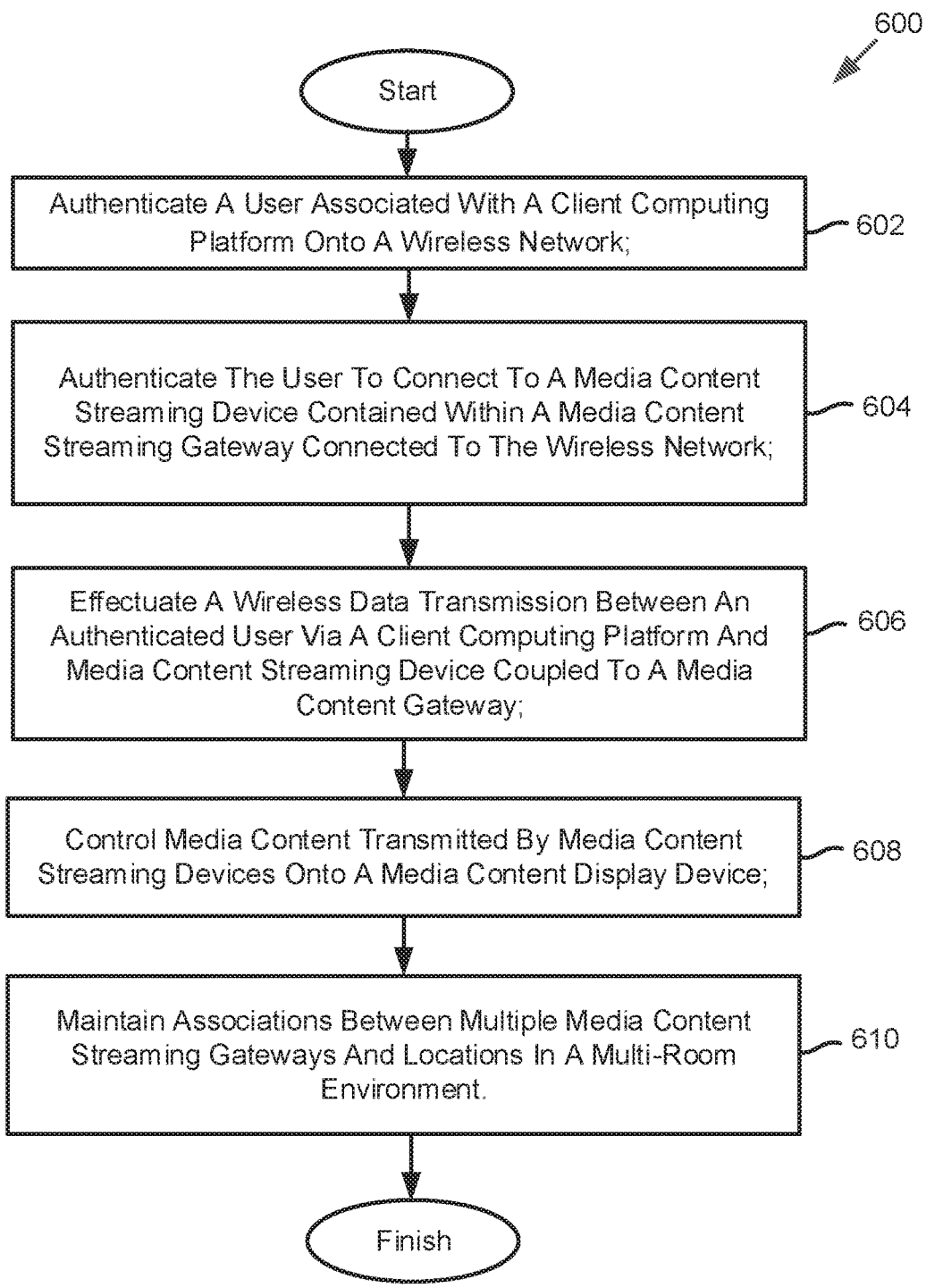
FIG. 6 illustrates a method of for controlling media content with a client computing platform in a wireless communication network via a media content streaming device communicatively coupled within a media content streaming gateway, in accordance with one or more implementations.

FIG. 6 illustrates a method 60 for controlling media content with a wireless device in a wireless communication network via a media content streaming device communicatively coupled to a media content streaming gateway, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, a user associated with a client computing platform may be authenticated onto a wireless network. At an operation 604, a user associated with a client computing platform connected to a wireless network may be authenticated to obtain access to a media content streaming device. The authentication information and/or authentication parameters may include a user name, a user location and/or other information. In some implementations, operation 602 and operation 604 may be performed by one or more physical processors executing an access component the same or similar to access component 106.

At an operation 606, an authenticated user may effectuate a wireless data transmission via a media content streaming device coupled to a media content Gateway by way of authenticated user's client computing platform. In some implementations, operation 606 may be performed by one or more physical processors executing an streaming component the same or similar to streaming component 108.

At an operation 608, media content transmitted by media content streaming device and displayed on a media content display device may be controlled by an authenticated user via user's client computing platform. In some implementations, operation 408 may be performed by one or more physical processors executing an orientation component the same or similar to control component 110.

At an operation 610, associations between multiple media content streaming gateway and locations in a multi-room environment may be maintained. In some implementations, operation 610 may be performed by one or more physical processors executing a maintenance component the same or similar to maintenance component 112.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed:

1. A system configured to control media content transmission in a multi-user environment, the system comprising:
   a connecting device comprising a first interface configured to communicatively couple a streaming device, and a second interface configured to communicatively couple an access point, wherein the streaming device is communicatively coupled to a display device; and
   a plurality of communication devices operated by a plurality of users, each communication device configured to transmit content from the communication device onto the display device during a wireless data communication session via the streaming device;
   wherein the wireless communication session between an individual communication device and the access point is established by authenticating a user associated with the individual connecting device during an authentication process by assigning the individual communication device to the access point; and wherein the assigned individual communication device transmits content via the streaming device communicatively coupled to the assigned access point via the connecting device.

2. The system of claim 1, wherein the individual communication device is configured to access a global internet using the assigned access point.

3. The system of claim 1, wherein the individual communication device is configured to communicate with the streaming device over one or more communication protocols comprising at least one of Bluetooth, Wi-Fi, near field communication, and RFID communication protocols.

4. The system of claim 1, wherein the display device is configured to receive high definition television signal.

5. The system of claim 1, wherein the streaming device is configured to be communicatively coupled to the display device via a high definition multimedia interface (HDMI).

6. The system of claim 2, wherein the content transmitted by the individual communication device via the streaming device onto the display device is received from the global internet.

7. The system of claim 1, wherein the authentication process comprises:
   receiving user information comprising an identification input; and
   comparing the identification input with an authentication parameter the access point is assigned to the individual communication device upon determining the identification input matches the authentication parameter.

8. The system of claim 2, wherein the content received by the streaming device is monitored by:
   obtaining information related to the content transmitted by the individual communication device; and
   obtaining information related to the content received from the global internet by the streaming device.

9. The system of claim 1, wherein the connecting device is configured to supply power to the streaming device.

10. The system of claim 1, wherein the power supplied to the streaming device is monitored by:
    obtaining information related to a power usage of the streaming device; and
    transmitting the information to the individual communication device.

11. The system of claim 1, wherein associations between the assigned access point, the streaming device, and the individual communication device are maintained.

12. A method for controlling media content transmission in a multi-user environment, the method comprising:
    establishing a wireless communication session between an individual communication device of a plurality of communication devices operated by a plurality of users, and an access point by authenticating a user associated with the individual connecting device during an authentication process by assigning the individual communication device to the access point; and
    transmitting content from the individual communication device via a streaming device onto a display device during the wireless data communication session, wherein the streaming device is configured to communicatively couple the display device, and wherein the streaming device is configured to communicatively couple the assigned access point via a connecting device, wherein the connecting device comprises a first interface configured to communicatively couple the streaming device and a second interface configured to communicatively couple the assigned access point.

13. The method of claim 12, wherein the individual communication device is configured to communicate with the streaming device over one or more communication protocols comprising at least one of Bluetooth, Wi-Fi, near field communication, and RFID communication protocols.

14. The method of claim 12, wherein the display device is configured to receive high definition television signal.

15. The method of claim 12, wherein the streaming device is configured to be communicatively coupled to the display device via a high definition multimedia interface (HDMI).

16. The method of claim 12, wherein the authentication process comprises:
    receiving user information comprising an identification input; and
    comparing the identification input with an authentication parameter;
    wherein the access point is assigned to the individual communication device upon determining the identification input matches the authentication parameter.

17. The method of claim 12, wherein the connecting device is configured to supply power to the streaming device.

18. The method of claim 12, wherein the power supplied to the streaming device is monitored by:
    obtaining information related to a power usage of the streaming device; and
    transmitting the information to the individual communication device.

19. The method of claim 12, wherein associations between the assigned access point, the streaming device, and the individual communication device are maintained.

* * * * *